United States Patent [19]

Binger et al.

[11] 3,771,214

[45] Nov. 13, 1973

[54] ALUMINUM WELDING

[75] Inventors: Wayne W. Binger, New Kensington; Richard K. Sager, Lower Burrell, both of Pa.

[73] Assignee: Aluminum Company of America, Pittsburgh, Pa.

[22] Filed: Dec. 8, 1971

[21] Appl. No.: 206,217

Related U.S. Application Data

[62] Division of Ser. No. 392, Jan. 2, 1970.

[52] U.S. Cl. ............... 29/488, 29/197.5, 29/504, 75/138, 75/144, 75/147, 75/148
[51] Int. Cl. ..................... B23k 1/20, B23k 31/02
[58] Field of Search ................ 75/138, 139, 142, 75/143, 144, 147, 148; 29/193, 504, 197.5, 503, 488; 148/32, 32.5

[56] References Cited
UNITED STATES PATENTS

| | | | |
|---|---|---|---|
| 1,595,219 | 8/1926 | Pacz | 75/148 |
| 1,870,732 | 8/1932 | Iytoko | 75/147 |
| 2,137,639 | 11/1938 | Stendel et al. | 75/147 |
| 2,763,546 | 9/1956 | Schluchter | 75/147 |
| 3,285,717 | 11/1966 | Fischer | 29/197.5 |
| 3,482,305 | 12/1969 | Dockus et al. | 29/504 X |
| 3,512,221 | 5/1970 | Schoerner | 75/138 |

FOREIGN PATENTS OR APPLICATIONS 618,129  4/1961  Canada .......................... 29/197.5

OTHER PUBLICATIONS

Welding Handbook, Section 4, 5th Edition, edited by Arthur L. Phillips, 1966, pp. 69.1–69.3,69.6–69.7,69.-10–69.13,69.19,69.20,69.21,69.27,69.28,69.29,69.30-,69.31,69.32,69.34.

Welding Kaiser Aluminum, 1st Edition, published by Kaiser Aluminum Co.

*Primary Examiner*—Robert D. Baldwin
*Assistant Examiner*—Ronald J. Shore
*Attorney*—Carl R. Lippert

[57] ABSTRACT

Introducing small amounts of cobalt, nickel, or iron into a weld joint between members of aluminum and its alloys substantially eliminates weld porosity. These additives may be included in the rod or wire used to provide the weld filler metal.

19 Claims, No Drawings

ALUMINUM WELDING

This is a division of U.S. Pat. application Ser. No. 392, filed Jan. 2. 1970.

BACKGROUND OF THE INVENTION

The invention relates to joining aluminum and aluminum base alloy members by fusion welding processes which normally contemplate continuously adding filler weld metal in a molten pool at the weld joint site. In such welds there is often encountered an excessive amount of porosity which lowers the strength and otherwise reduces the integrity of the welded joint. The porosity is revealed easily by X-ray analysis or destructive testing. This porosity necessitates removal of the defective weld material which must then be replaced with sound metal. Extremely careful cleaning and welding conditions may reduce this porosity condition but often impose undesirable quality control problems and additional costs and are not relay reliable. It is believed that the porosity might be caused by moisture although cleanliness and careful maintenance of dryness cannot be relied upon to consistently produce porosity free welds.

DESCRIPTION

The welding processes contemplated in practicing the invention are those wherein aluminum base alloy members, generally referred to as parent members, are joined by fusion wherein a pool of molten metal is formed across the joint and then solidified. Most often a separate filler metal is used to provide the joint metal. The weld processes contemplated inherently involve some penetration of the parent members being joined at the weld site such that some amount of metal is melted from the members and enters the molten metal pool. This can be contrasted with friction and pressure welding processes which involve some metal flow and, in some cases, perhaps some degree of incipient melting. The contemplated processes are also considerably different from brazing or soldering of aluminum in which filler metal of an aluminum base alloy (for brazing) or some other alloy (for soldering) filler metal is applied to the joint site and wets the joint site surfaces of the members being joined, usually by capillary action, and then solidifies. The processes contemplated by the invention include applying heat energy usually in the form of an electric arc. The electrode for the arc may be the weld filler metal rod or it may be some other metal. For instance the tungsten inert gas (TIG) process features a tungsten electrode and a shielding gas outlet in a welding "torch." The filler metal is introduced separately into the arc and the molten metal pool. In the metal arc process (MIG) the situation is much like that in the TIG process except that the filler metal serves as a consumable electrode. Of course in gas welding a combustible gas flame melts both the filler metal and some amount of parent metal at the filler joint site. In shielded metal arc welding a coated filler alloy rod is fused such that the filler metal and the flux coating drop into the molten metal pool at the joint site where the filler metal is covered and shielded by the fused flux coating material and the slag produced by the flux. These processes are all known and accordingly are only described very briefly.

The aluminum base alloy parent members may be composed of any of the various aluminum alloys which include aluminum and one or more of the elements copper, magnesium, zinc, silicon, chromium, manganese and other elements often included in aluminum alloys. The improvement applies to all such alloys although it may be less pronounced in some alloys, for instance those containing substantial amounts, over 3 percent, of copper, especially where the members are relatively thin in cross section. The parent members may be cast or wrought structural members and may be of different composition. The improvement contemplates introducing into the molten metal pool formed at the welding site an effective amount of a metal additive selected from the group consisting of cobalt, iron and nickel. This is most easily accomplished by including the additive in the composition of the weld filler metal which is normally in the form of a rod or wire. Accordingly the invention contemplates an improved welding rod or electrode by which is meant rod, wire, and the like, suited to be a source of weld filler, and consisting essentially of aluminum and at least one metal additive selected from the group consisting of 0.2 to 2 percent Fe, 0.2 to 2.5 percent Ni and 0.05 to 2 percent Co, the percentages being by weight. The total of all these additives should not exceed 3 percent. These additives are most effective when more than one is included. For instance Fe and Co are more effective than either alone. Accordingly the following minimum values apply where there is only one additive included in the weld rod: 0.1 percent for Co, 0.85 percent for Fe and 0.65 percent for Ni. One embodiment contemplates including as the additives Fe and Ni present in amounts such that the sum of Fe and Ni is between 0.5 and 2.5 percent. A preferred embodiment contemplates that the sum of Fe and Ni is between 1 and 2 percent and that the ratio of Fe/Ni is between 1.1 and 1.5. The aluminum base weld filler alloy in which the additives are included may be more or less pure aluminum or many of the various alloys commonly used as filler metal. Accordingly the improved weld rod may typically contain, in addition to the metal additives just discussed, 2 to 6 percent magnesium or 3 to 11 percent silicon. Especially where the rod contains 2 to 6 percent Mg it may also contain one or more of the following elements: 0.05 to 1 percent manganese, 0.05 to 0.4 percent chromium and 0.01 to 0.2 percent titanium. The improved weld filler metal does not contain substantial amounts of copper by which is meant it contains not more than 1 percent Cu as welds containing high amounts of Cu are not greatly inproved in practicing the invention.

In addition to incorporating the Co, Fe or Ni elements in the weld filler metal rod, the invention in a broader sense contemplates including the additives in the composition of the parent members being joined especially where they are rather thin in cross section . Also, the additives could be placed at the weld site or included in the coating of a coated electrode. What is really required is that some effective amount be provided in the molten pool formed in making the weld. What is meant by an effective amount is that amount which would be introduced by including the above set forth amount of the additives in the weld rod. In forming welds practicing the invention special or cumbersome cleaning procedures are not required and the members are simply brought into joining relationship, by which is meant proximity and configuration appropriate for welding, to provide a joint site and then welded using more or less conventional techniques.

It is significant that the additives contemplated by the invention do not introduce undesirable side effects. Accordingly in the manufacture of weld rod or wire by rolling and drawing operations, in making welds, and in utilizing the welded assemblies for the various intended purposes, there are no significant problems raised in practicing the invention.

To illustrate the practice of the invention and the improvements derived therefrom the following examples proceed. In each example an inverted T section was formed by welding a fillet on both sides of the intersection which established the joint site. The members were in aluminum alloy 6061, containing nominally 0.6 percent Si, 0.25 pervent Cu, 1 percent Mg and 0.2 percent Cr, and were about ¼ inch thick. The members were cleaned by simply wiping their weld site surfaces with a solvent such as toluene or methyl-ethyl ketone. They were welded using the MIG process in the flat position using filler wire one-eighth inch in diameter. The table below sets forth the composition of the aluminum weld wire used in making the welds together with the condition of the resulting weld. The welds were broken in half for visual examination. In the table below examples 1, 2 and 3 typify the practice of the invention whereas examples 4 and 5 are outside the practice of the invention. The welds performed according to the practice of the invention were free of any significant porosity whereas the welds in examples 4 and 5 exhibited wide spread porosity conditions where the pores varied from a few thousandths to almost 1/16 inch in size.

TABLE

| Ex. | Si | Co | Fe | Weld Condition |
|---|---|---|---|---|
| 1 | 5.06 | 0.49 | 0.47 | Pore Free |
| 2 | 4.96 | 0.09 | 0.47 | Pore Free |
| 3 | 5.14 | | 0.85 | Pore Free |
| 4 | 5.12 | | 0.03 | Porous |
| 5 | 5.03 | | 0.46 | Porous |

To further demonstrate the advantages of the invention welds were made using a weld filler metal wire in accordance with Examples 1 and 2. Butt type welds and rods on plate were made using the MIG process in the flat position. Into the argon shielding gas there was deliberately introduced 300 parts per million moisture which would normally be considered disastrous. However, the welds produced were free of porosity. In another test using the same weld filler metal 600 ppm moisture were introduced into the shielding gas and again the welds were sound. In addition several welds were made in the overhead position which is a position most prone to porosity. Even here, the welds in accordance with the invention were pore free.

From all of the foregoing it becomes very apparent that the improvements herein described offer highly significant advantages in the field of fusion welding aluminum members so as to provide greatly improved assemblies comprising aluminum parent members.

What is claimed is:

1. A method of fusion welding members of aluminum and its alloys comprising:
   1. bringing said members into joining relationship at a joint site,
   2. fusion depositing an aluminum base alloy filler metal containing at least 85 percent aluminum and at least two elements one additive from the group consisting of 0.2 to 2 percent Fe, 0.2 to 2.5 percent Ni and 0.05 to 2 percent Co, the following minimum values applying where less than two of said metal additives is present: 0.1 percent for Co, 0.85 percent for Fe and 0.65 percent for Ni, the total of Fe + Ni + Co not exceeding 3 percent, to form a pool of molten metal at said site,
   3. solidifying said pool, thereby to form a welded joint comprising said members joined by a weldment, said weldment being characterized by greatly reduced porosity than if formed without said metal elements additive.

2. The method according to claim 1 wherein said aluminum base filler metal also contains 2 to 6 percent Mg and at least one element selected from the group consisting of 0.05 to 1 percent Mn, 0.05 to 0.4 percent Cr and 0.01 to 0.2 percent Ti.

3. The method according to claim 1 wherein said aluminum base filler metal also contains 3 to 11 percent Si.

4. The method according to claim 1 wherein both Fe and Ni are present in said aluminum filler metal and the total of Fe + Ni is between 0.5 and 2.5 and the filler metal does not contain more than 1 percent copper.

5. The method according to claim 1 wherein both Fe and Ni are present and their combined total is between 1 and 2 percent and the ratio Fe/Ni is between 1.1 and 1.5.

6. The method according to claim 1 wherein said aluminum base filler metal contains iron and cobalt.

7. A method of fusion welding wrought members of aluminum and its alloys comprising:
   1. bringing said wrought members into joining relationship at a joint site,
   2. forming a pool of molten metal at said site, said pool containing at least 85 percent aluminum and at least one additive two elements from the group consisting of 0.2 to 2 percent Fe, 0.2 to 2.5 percent Ni and 0.05 to 2 percent Co, the following minimum values applying where less than two of said metal additives is present: 0.1 percent for Co, 0.85 percent for Fe and 0.65 percent for Ni, the total of Fe + Ni + Co not exceeding 3 percent,
   3. solidifying said pool, thereby to form a welded joint characterized by greatly reduced porosity than if formed without said metal elements additive.

8. The method according to claim 1 wherein said aluminum base filler metal contains nickel and cobalt.

9. In the method of fusion welding wrought members composed of aluminum or aluminum alloys wherein said wrought members are brought into joining relationship at a joint site and aluminum base weld filler metal is fusion deposited to form a pool of molten metal at the joint site said pool being solidified to provide a welded joint, the improvement comprising providing said aluminum base filler metal as a weld rod composed of an aluminum base alloy containing at least 85 percent aluminum and at least two elements one additive from the group consisting of 0.2 to 2 percent Fe, 0.2 to 2.5 percent Ni and 0.05 to 2 percent Co, the total of Fe + Ni + Co not exceeding 3 percent.

10. The improved method according to claim 9 wherein said aluminum base filler metal weld rod also contains 2 to 6 percent Mg and at least one element selected from the group consisting of 0.05 to 1 percent Mn, 0.05 to 0.4 percent Cr and 0.01 to 0.2 percent Ti.

11. The improved method according to claim 9 wherein said aluminum base filler metal rod weld also contains 3 to 11 percent Si.

12. A method of fusion welding wrought members of aluminum and its alloys comprising:
  1. bringing said wrought members into joining relationship at a joint site,
  2. fusion depositing an aluminum base alloy filler metal containing at least 85 percent aluminum and one element selected from the group consisting of 2 to 6 percent Mg or 3 to 11 percent Si and additionally at least one additional element additive from the group consisting of 0.2 to 2 percent Fe, 0.2 to 2.5 percent Ni and 0.05 to 2 percent Co, the following minimum values applying where less than two of said metal additives is present: 0.1 percent for Co, 0.85 percent for Fe and 0.65 percent for Ni, the total of Fe + Ni + Co not exceeding 3 percent, to form a pool of molten metal at said site,
  3. solidifying said pool, thereby to form a welded joint comprising said members joined by a weldment, said weldment being characterized by greatly reduced porosity than if formed without said metal element additive.

13. The method according to claim 12 wherein said filler metal contains 2 to 6 percent Mg and at least one element from the group consisting of 0.05 to 0.1 percent Mn, 0.05 to 0.4 percent Cr and 0.01 to 0.2 percent Ti.

14. A method of fusion welding wrought members of aluminum and its alloys comprising:
  1. bringing said wrought members into joining relationship at a joint site,
  2. fusion depositing an aluminum base alloy filler metal containing at least 85 percent aluminum, and 0.1 0.05 to 2 percent cobalt, to form a pool of molten metal at said site,
  3. solidifying said pool, thereby to form a welded joint comprising said members joined by a weldment, said weldment being characterized by greatly reduced porosity than if formed without said cobalt metal additive.

15. A method of fusion welding wrought members of aluminum and its alloys comprising:
  1. brining said wrought members into joining relationship at a joint site,
  2. fusion depositing an aluminum base alloy filler metal containing at least 85 percent aluminum, not more than 1 percent Cu, and, 0.2 to 2 percent Fe and 0.2 to 2.5 percent Ni, the total of Fe + Ni being substantially between 0.5 and 2.5 percent, to form a pool of molten metal at said site,
  3. solidifying said pool, thereby to form a welded joint comprising said members joined by a weldment, said weldment being characterized by greatly reduced porosity than if formed without said Fe and Ni.

16. In the method of fusion welding wrought members composed of aluminum or aluminum alloys wherein said wrought members are brought into joining relationship at a joint site and aluminum base weld filler metal is fusion deposited to form a pool of molten metal at the joint site, said pool being solidified to provide a welded joint, the improvement comprising providing said aluminum base filler metal as a weld rod composed of an aluminum base alloy containing at least 85 percent aluminum, 2 to 6 percent Mg and at least one element additive from the group consisting of 0.2 to 2 percent Fe, 0.2 to 2.5 percent Ni and 0.05 to 2 percent Co, the following minimum values applying where less than two of said metal additives is present: 0.1 percent for Co, 0.85 percent for Fe and 0.65 percent for Ni, the total of Fe + Ni + Co not exceeding 3 percent.

17. In the method of fusion welding wrought members composed of aluminum or aluminum alloys wherein said wrought members are brought into joining relationship at a joint site and aluminum base weld filler metal is fusion deposited to form a pool of molten metal at the joint site, said pool being solidified to provide a welded joint, the improvement comprising providing said aluminum base filler metal as a weld rod composed of an aluminum base alloy containing at least 85 percent aluminum, 3 to 11 percent Si and at least one element from the group consisting of 0.2 to 2 percent Fe, 0.2 to 2.5 percent Ni and 0.05 to 2 percent Co, the following minimum values applying where less than two of said metal additives is present: 0.1 percent for Co, 0.85 percent for Fe and 0.65 percent for Ni, the total of Fe + Ni + Co not exceeding 3 percent.

18. The method according to claim 16 wherein the weld rod also contains at least one element selected from the group consisting of 0.05 to 1 percent Mn, 0.05 to 0.4 percent Cr and 0.01 to 0.2 percent Ti.

19. In the method of fusion welding wrought members composed of aluminum or aluminum alloys wherein said wrought members are brought into joining relationship at a joint site and aluminum base weld filler metal is fusion deposited to form a pool of molten metal at the joint site said pool being solidified to provide a welded joint, the improvement comprising providing said aluminum base filler metal as a weld rod composed of an aluminum base alloy containing at least 85 percent aluminum and 0.1 to 2 percent cobalt.

* * * * *

UNITED STATES PATENT OFFICE
CERTIFICATE OF CORRECTION

Patent No. 3,771,214          Dated November 13, 1973

Inventor(s) Wayne W. Binger and Richard K. Sager

It is certified that error appears in the above-identified patent and that said Letters Patent are hereby corrected as shown below:

| | |
|---|---|
| Col. 1, line 19 | Change "relay" to --really--. |
| Col. 2, line 51 | Change "fller" to --filler--. |
| Col. 3, line 14 | Change "pervent" to --percent--. |
| Claim 1, line 1 | After "welding" insert --wrought--. |
| Claim 1, line 3 | After "said" insert --wrought--. |
| Claim 1, line 7 | Delete "one additive". |
| Claim 1, lines 9 to 12 | After "Co," delete "the following minimum values applying where less than two of said metal additives is present: 0.1% for Co, 0.85% for Fe and 0.65% for Ni,". |
| Claim 1, line 19 | Delete "additive". |
| Claim 7, line 7 | Delete "one additive". |
| Claim 7, lines 9 to 12 | After "Co," delete "the following minimum values applying where less than two of said metal additives is present: 0.1% for Co, 0.85% for Fe and 0.65% for Ni,". |
| Claim 7, lines 16 to 17 | Delete "additive". |

UNITED STATES PATENT OFFICE  Page 2
CERTIFICATE OF CORRECTION

Patent No. 3,771,214            Dated November 13, 1973

Inventor(s) Wayne W. Binger and Richard K. Sager

It is certified that error appears in the above-identified patent and that said Letters Patent are hereby corrected as shown below:

(continued)

| | |
|---|---|
| Claim 9, lines 8 to 9 | Delete "as a weld rod composed of an aluminum base alloy". |
| Claim 9, line 11 | Delete "one additive". |
| Claim 10, line 2 | Delete "weld rod". |
| Claim 11, line 2 | Delete "rod weld". |
| Claim 12, line 9 | Delete "additive". |
| Claim 12, line 21 | Delete "additive". |
| Claim 14, line 7 | Delete "0.05". |
| Claim 14, line 13 | Delete "metal additive". |
| Claim 15, line 3 | Change "brining" to --bringing--. |
| Claim 16, lines 8 to 9 | Delete "as a weld rod composed of an aluminum base alloy". |
| Claim 16, line 11 | Delete "additive". |
| Claim 16, line 12 | Change "and0.05" to --and 0.05--. |
| Claim 16, line 15 | Change "sent:0.1" to --sent: 0.1--. |

UNITED STATES PATENT OFFICE
CERTIFICATE OF CORRECTION

Page 3

Patent No. 3,771,214      Dated November 13, 1973

Inventor(s) Wayne W. Binger and Richard K. Sager

It is certified that error appears in the above-identified patent and that said Letters Patent are hereby corrected as shown below:

(continued)

Claim 17, lines 8 to 9      Delete "as a weld rod composed of an aluminum base alloy".

Claim 17, line 12      Change "and0.05" to --and 0.05--.

Signed and sealed this 9th day of April 1974.

(SEAL)
Attest:

EDWARD M. FLETCHER, JR.
Attesting Officer

C. MARSHALL DANN
Commissioner of Patents